No. 817,328. PATENTED APR. 10, 1906.
C. S. LLOYD.
METHOD OF FORMING WIRE CABLES.
APPLICATION FILED DEC. 21, 1903.
2 SHEETS—SHEET 1.
FIG. 1
FIG. 2
FIG. 3
FIG. 4
FIG. 5
FIG. 6
FIG. 7   FIG. 8   FIG. 9   FIG. 10   FIG. 11
WITNESSES
INVENTOR
CYRUS S. LLOYD
BY Paul & Paul
his Attorneys

UNITED STATES PATENT OFFICE.

CYRUS SING LLOYD, OF MINNEAPOLIS, MINNESOTA.

METHOD OF FORMING WIRE CABLES.

No. 817,328.    Specification of Letters Patent.    Patented April 10, 1906.

Application filed December 21, 1903. Serial No. 186,013.

*To all whom it may concern:*

Be it known that I, CYRUS SING LLOYD, of Minneapolis, in the county of Hennepin, State of Minnesota, have invented certain new and useful Improvements in Methods of Forming Wire Cables, of which the following is a specification.

This invention relates to improvements in the art of forming wire cables; and the object I have in view is to provide a novel method by which wire cables may be quickly and cheaply formed.

The invention consists generally in producing wire cables by first forming a series of parallel wires into spiral coils, and thereby producing a hollow wire cable, and, second, elongating said coils, and thereby reducing their diameter and the diameter of the wire cable.

In the accompanying drawings, forming part of this specification, Figure 1 is a side elevation of a portion of a hollow wire cable, illustrating the first step of my method. Fig. 2 shows the same cable after the coils thereof have been elongated and the diameter of the cables reduced and the series of wires separated. Fig. 3 shows the same cable after its coils have been further elongated and the diameter of the cable further reduced and the series of coils thereby brought closely together again, forming the completed cable. Fig. 4 is a side elevation of a portion of a hollow cable formed of two parallel wires. Fig. 5 shows the same cable with the coils elongated and the cable reduced in diameter so as to form a cable of two wires twisted together. Fig. 6 is a side elevation of a portion of a hollow cable with a core arranged therein. Fig. 7 is a transverse section of the hollow cable shown in Fig. 1. Fig. 8 is a transverse section of the hollow cable shown in Fig. 2. Fig. 9 is a transverse section of the cable shown in Fig. 3. Fig. 10 is a transverse section of the cable shown in Fig. 4, and Fig. 11 is a transverse section of the cable shown in Fig. 6. Fig. 12 is a side elevation, partly broken away, showing the manner of splicing or uniting the ends of two sections of the hollow cable. Fig. 13 is a side elevation of the cable shown in Fig. 12 after the spirals have been elongated. Fig. 14 is a transverse section on line *a a* of the cable shown in Fig. 13. Fig. 15 is a side elevation showing two sections of the cable united by having the end portion of one section reduced in diameter and inserted within the other section, after which the cable is further reduced, and thereby the outer section is firmly united with the inner. Fig. 16 is a transverse section showing one cable-section within another, the inner cable-section being formed of a less number of wires than the outer section.

In carrying out my invention I preferably take a series of wires 2 and coil them helically, keeping said wires in contact with and parallel to one another, thereby forming a hollow cable of considerable diameter. This hollow cable is preferably formed by giving the helices a very short pitch, as shown in Figs. 1 and 4 of the drawings. I do not, however, limit myself to any particular pitch of helices. In Fig. 1 of the drawings I have shown such a cable formed of six parallel helically-coiled wires. In this way I produce a hollow cable consisting of a series of helically-coiled parallel wires in contact with one another, as illustrated in Figs. 1 and 4 of the drawings. If preferred, I may so coil the wires that they are not all in contact, as illustrated in Fig. 2 of the drawings, in which the several wires are shown lying close against one another; but the coils are of such length and pitch that the first wire of the series does not come in contact with the last wire of the series, or, if preferred, the wires may all be separated by elongating the cable to prevent contact of the wires with one another except upon their inner surfaces, where they cross each other. After the hollow cable is formed I elongate it, either by stretching it or by compressing it between grooved rollers or by other suitable means, which reduces its diameter. In this step of the process the diameter of the cable is usually very much reduced, in the first part of the operation the wires being separated, so that the first and last wires of the series do not come in contact, as shown in Fig. 2 of the drawings, and the further elongation of the coils solidifying the cable and bringing the wires throughout closely in contact, as shown in Fig. 3 of the drawings. Where the hollow cable is formed of two wires only, the elongation of the coils forms a cable consisting of two wires closely twisted together, as shown in Fig. 5 of the drawings.

It is frequently desired for electrical transmission to provide a cable having therein a core of insulating material with conductingwires arranged therein. As shown in Fig. 6, I may form a hollow cable of helically-coiled parallel wires in contact with one another, with the opening through the cable of considerably greater diameter than the core to be arranged therein. A core 3, which, if desired, may have electrical conductors 5 arranged therein, may then be placed within the hollow cable, and by elongating the coils by stretching or by rolling or by other means the diameter of the hollow cable may be reduced, causing it to be firmly brought in contact with the circumference of the core at all points. By this means the core is completely protected, and the protecting covering is in this manner quickly and cheaply applied.

By this novel method of forming wire cables the use of a core or mandrel upon which to form the cable is entirely dispensed with and the use of expensive twisting machinery is also dispensed with. I may form a solid cable consisting of two or more wires, as illustrated in Fig. 5 of the drawings, or I may form a cable with a very small opening therethrough, as illustrated in Figs. 3 and 9 of the drawings.

I have demonstrated by actual practice that a series of wires may be coiled into a hollow cable without a central mandrel or core when the coils are made of sufficient diameter, and I have discovered that by elongating such a closely-coiled hollow cable, thereby reducing its diameter, either by circumferential pressure or by stretching the cable, the series of wires will first be separated, while at the same time the diameter of the cable is reduced, and a further elongation will bring the wires again closely together, as illustrated in Fig. 3 of the drawings, and that in this manner a cable with the wires closely together may be rapidly and economically formed.

For the purpose of forming a continuous cable I may join the end of one section of the cable to the end of another section. For this purpose I may take a short piece 7 of the cable after it has been compressed or reduced to small diameter and insert it within the abutting ends of two sections of the hollow cable formed of the wires 2, as shown in Fig. 12 of the drawings. Then by passing the cable, including the joint, between suitable compressing-rolls the coils will be elongated and the diameter of the cable reduced, bringing the parts into substantially the form shown in Fig. 13 of the drawings. In this way a secure joint will be formed between two sections of the cable without materially increasing the diameter thereof. Instead of placing a separate piece of cable within the ends of the hollow cable-sections I may elongate the coils and reduce the diameter of one section and then push the end of this reduced cable into the end of another section of the hollow cable, as shown in Fig. 15 of the drawings. Then by passing this joint between suitable compressing-rolls I elongate the coils of both sections and very materially reduce the diameter of the cable at the joint. The same method may be employed where it is desired to form a cable of extra strength. The end of one cable may be reduced in diameter and then inserted within another hollow cable, and the two cables may then be passed between suitable compressing-rolls and the diameter of the whole reduced and the helices elongated. In this construction it is frequently desirable to have the inner cable formed of a less number of wires than the outer cable, and I frequently make the cable that is to go on the inside of a less number of wires than the outer cable. Then by first compressing the inner cable and reducing its diameter and inserting it within the outer cable and then passing the whole between helically-grooved rolls I am enabled to reduce the diameter of the whole and have both the wires of the inner and outer cables close together throughout their entire length.

I do not limit myself to any particular means for coiling the wires or for elongating the cables. It may be done, as already stated, either by stretching the hollow cable or by passing it between grooved rolls and elongating the coils and reducing their diameter.

I claim as my invention—

1. The method of producing wire cables consisting in, first, forming a series of wires into parallel helical coils, and, second, elongating said coils and thereby reducing their diameter.

2. The method of producing hollow wire cables consisting in, first, forming a series of wires into parallel helical coils; second, elongating said coils and thereby reducing their diameter and separating the series of wires; and, third, still further elongating said coils and thereby further reducing their diameter and bringing the series of wires closely together.

3. The method of producing hollow wire cables consisting in first, forming a series of wires into parallel helical coils lying closely against each other, and, second, elongating said coils and thereby reducing their diameter.

4. The method of producing wire cables containing suitable cores consisting in first, forming a series of wires into parallel helical coils; second, inserting within the hollow cable formed by said helical coils a core of less diameter than the internal diameter of said coils; and, third, elongating said coils and thereby reducing their diameter and bringing them in contact with the surface of said core.

5. The method of producing wire cables containing insulated electrical conductors consisting in, first, forming a series of wires into parallel helical coils; second, inserting within said helical coils a suitable core containing a series of insulated electrical conductors, the diameter of said core being less than the internal diameter of said coils; and, third, elongating said coils, thereby reducing their diameter and bringing them in contact with the surface of said core.

6. In the production of wire cables the method of securing hollow cable-sections together which consists in inserting within the ends of said hollow sections, cable-sections of smaller diameter, and then elongating the coils and reducing the diameter of said hollow sections.

7. The method of producing wire cables consisting in, first, forming a series of wires into parallel helical coils; second, elongating said coils and thereby reducing their diameter; third, inserting a section of the reduced cable into a section of hollow cable whose diameter has not been reduced; fourth, elongating the coils and reducing the diameter of the combined cables.

8. The method of producing wire cables which consists in, first, forming two hollow cables, one of which is composed of a less number of wires than the other; second, elongating the coils and thereby reducing the diameter of the hollow cable that is formed of the less number of wires; third, inserting this reduced cable into the other hollow cable; fourth, elongating the coils and reducing the diameter of the combined cables.

In witness whereof I have hereunto set my hand this 6th day of November, 1903.

CYRUS SING LLOYD.

In presence of—
A. C. PAUL,
C. G. HANSON.